(12) United States Patent
Nicholson

(10) Patent No.: US 11,370,184 B2
(45) Date of Patent: Jun. 28, 2022

(54) CASSETTE FOR SECURING FIBER-OPTIC CABLES AND FERRULES DURING THE CURING PROCESS

(71) Applicant: Anthony Nicholson, Alpharetta, GA (US)

(72) Inventor: Anthony Nicholson, Alpharetta, GA (US)

( * ) Notice: Subject to any disclaimer, the term of this patent is extended or adjusted under 35 U.S.C. 154(b) by 148 days.

(21) Appl. No.: 16/795,256

(22) Filed: Feb. 19, 2020

(65) Prior Publication Data

US 2021/0252811 A1  Aug. 19, 2021

(51) Int. Cl.
*B29D 11/00* (2006.01)
*G02B 6/38* (2006.01)

(52) U.S. Cl.
CPC .... *B29D 11/0075* (2013.01); *B29D 11/00673* (2013.01); *G02B 6/3861* (2013.01); *G02B 6/3865* (2013.01)

(58) Field of Classification Search
CPC .......... B29D 11/0075; B29D 11/00673; G02B 6/3865; G02B 6/3861
See application file for complete search history.

(56) References Cited

U.S. PATENT DOCUMENTS

| | | | |
|---|---|---|---|
| 5,074,021 A | 12/1991 | Feng et al. | |
| 5,720,907 A * | 2/1998 | Anderson | G02B 6/3837 264/1.25 |
| 5,913,976 A | 6/1999 | Patton et al. | |
| 6,945,706 B2 | 9/2005 | Gimbel et al. | |
| 7,068,906 B2 | 6/2006 | Bianchi et al. | |
| 9,829,648 B2 * | 11/2017 | Nicholson | G02B 6/3861 |
| 9,897,764 B2 | 2/2018 | Ott et al. | |

* cited by examiner

*Primary Examiner* — Mathieu D Vargot

(57) ABSTRACT

Disclosed herein is a cassette for securing fiber-optic cables and ferrules during the curing process. The cassette may include a base body may include a first cavity disposed at a cable section of the base body. Further, the first cavity may be configured for immovably securing a fiber-optic cable. Further, the base body may include a second cavity may be disposed at a middle section of the base body. Further, the second cavity may be characterized by a cavity length. Further, the cavity length corresponds to a length of the fiber-optic cable from a first cable end to a second cable end, the wherein the second cavity may be configured for accommodating the fiber-optic cable along the cavity length. Further, the base body may include a third cavity disposed at a fiber section of the base body. Further, the third cavity may be configured for immovably securing a ferrule.

20 Claims, 13 Drawing Sheets

CASSETTE FOR SECURING FIBER-OPTIC CABLES AND FERRULES DURING THE CURING PROCESS

FIELD OF THE INVENTION

Generally, the present disclosure relates to the field of fiber optics. More specifically, the present disclosure relates to cassettes for securing fiber-optic cables and ferrules during the curing process.

BACKGROUND

Existing techniques for securing fiber-optic cables and ferrules during the curing process are deficient with regard to several aspects. For instance, current technologies do not prevent relative movement between a fiber-optic cable and a ferrule during the curing process. Further, the current technologies do not provide mechanical integrity between an optical fiber of the fiber-optic cable and the ferrule that does not crimp to a cable jacket of the fiber-optic cable.

Therefore, there is a need for improved cassettes for securing fiber-optic cables and ferrules during the curing process that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a cassette for securing fiber-optic cables and ferrules during the curing process, in accordance with some embodiments. The cassette may include a base body. Further, the base body may include a first cavity disposed at a cable section of the base body. Further, the first cavity may be configured for immovably securing a fiber-optic cable. Further, the base body may include a second cavity may be disposed at a middle section of the base body. Further, the second cavity may be characterized by a cavity length. Further, the cavity length corresponds to a length of the fiber-optic cable from a first cable end to a second cable end, the wherein the second cavity may be configured for accommodating the fiber-optic cable along the cavity length. Further, the base body may include a third cavity disposed at a fiber section of the base body. Further, the third cavity may be configured for immovably securing a ferrule.

Further, in accordance with some embodiments, a cassette for securing fiber-optic cables and ferrules during the curing process may be disclosed. The cassette may include a base body and a top body. Further, the base body may include an upper body surface and a lower body surface. Further, the base body may include a first cavity disposed at a cable section of the upper body surface. Further, the first cavity may be configured for immovably securing a fiber-optic cable. Further, the base body may include a second cavity may be disposed at a middle section of the upper body surface. Further, the second cavity may be characterized by a cavity length. Further, the cavity length corresponds to a length of the fiber-optic cable from a first cable end to a second cable end, the wherein the second cavity may be configured for accommodating the fiber-optic cable along the cavity length. Further, the base body may include a third cavity disposed at a fiber section of the upper body surface. Further, the third cavity may be configured for immovably securing a ferrule. Further, the top body may be detachably coupled with the base body using at least one coupling mechanism. Further, the top body may be configured for covering the upper body surface.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
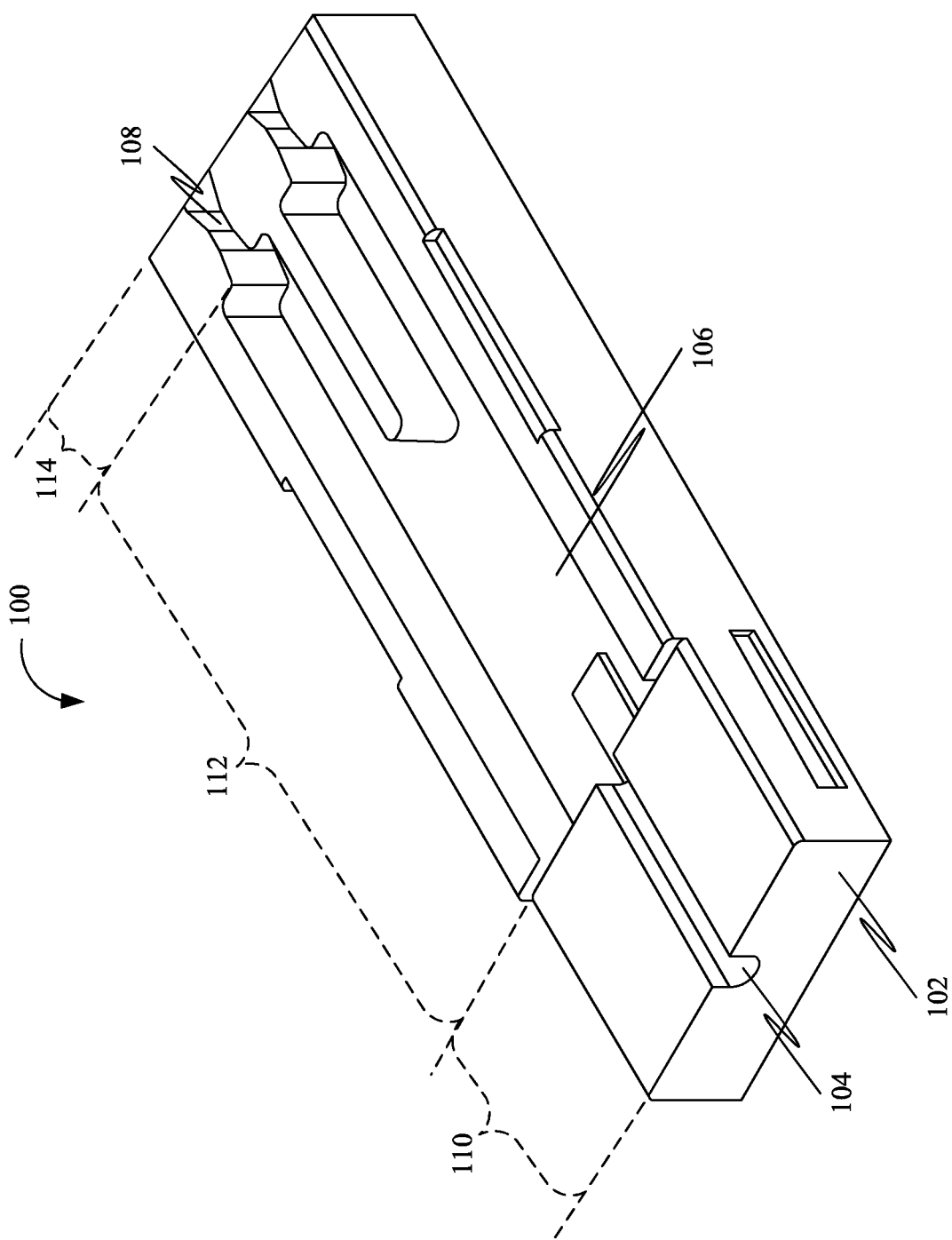
FIG. 1 is a top front perspective view of a cassette for securing fiber-optic cables and ferrules during the curing process, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of cassettes for securing fiber-optic cables and ferrules during the curing process, embodiments of the present disclosure are not limited to use only in this context.

Overview:

The present disclosure describes cassettes for securing fiber-optic cables and ferrules during the curing process. Further, the cassettes secure the ferrules and the fiber-optic cables in a situation in which crimping of the ferrules to cable jackets of the fiber-optic cables before the curing process is not possible. Further, the cassettes are used to maintain the mechanical integrity between an optical fiber of the fiber-optic cables and the ferrules during the curing process.

Further, the Cassettes would be inserted into a fixture and then placed in the curing oven. Further, for protecting, the optical fiber from breaking during handling a metal sleeve is placed over the ceramic ferrule and then the assembly can be placed in an oven block or fixture for curing. However, if the cable assembly has no crimp due to the structure or outer fiber diameter there is no mechanism preventing the ferrule from simply sliding off the fiber causing issues with assembly and failure at a later stage. Typically, a simplex or a duplex cable with cable jackets of 1.6-3 mm, for example, will have a crimp. However, if the cable jacket is 900 um or 250 um the connector will not be crimped in position.

There are connector designs that use two ferrules with a narrow pitch that is terminated with 250 um fiber and then cured and assembled. The maintained length from the ferrule tip to the cable jacket is critical to prevent fiber breaking during the assembly stage. Further, the cassettes are for all fiber optic connector assemblies where the cable jacket is not crimped (or has no crimp). The cassettes maintain the integrity of the fiber protruding from the ferrule and also the strict length tolerances required for the latest duplex style connector assemblies. As an added benefit the cassettes have a marking confirming where the jacket should be as a double-check that the components were stripped to the correct length.

Referring now to figures, FIG. 1 is a top front perspective view of a cassette 100 for securing fiber-optic cables and ferrules during the curing process, in accordance with some embodiments. Further, the cassette 100 may include a base body 102. Further, the base body 102 may include one or more of a first cavity 104, a second cavity 106 and a third cavity 108. Further, the first cavity 104 may be disposed at a cable section 110 of the base body 102. Further, the first cavity 104 may be configured for immovably securing a fiber-optic cable (not shown).

Further, in some embodiments, the first cavity 104 may include a first cavity curvature characterized by a cavity curvature arc length. Further, the first cavity curvature may be configured for partly encompassing a cable jacket of the fiber-optic cable characterized by a cable jacket circumference length. Further, the cavity curvature arc length may be less than the cable jacket circumference length. Further, the partly encompassing of the cable jacket may facilitate the first cavity for immovably securing the fiber-optic cable.

Further, in some embodiments, the first cavity 104 may include a lock mechanism (not shown) disposed along a first cavity wall of the first cavity 104. Further, the lock mechanism may include at least one spring-loaded panel. Further, the at least one spring-loaded panel may be configured for immovably securing the fiber-optic cable in the first cavity. Further, the lock mechanism may be associated with a lock state and an unlock state. Further, the lock mechanism may not allow relative movement between the fiber-optic cable and the first cavity 104 in lock state. Further, the lock mechanism may allow relative movement between the fiber-optic cable and the first cavity 104 in the unlock state. This is explained in further detail in conjunction with FIG. 9 below.

Further, the second cavity 106 may be disposed at a middle section 112 of the base body 102. Further, the second cavity 106 may be characterized by a cavity length. Further, the cavity length may correspond to a length of the fiber-optic cable from a first cable end to a second cable end. Further, the second cavity 106 may be configured for accommodating the fiber-optic cable along the cavity length.

Further, in some embodiments, the cavity length may correspond to a length of an optical fiber of the fiber-optic cable from the first fiber end to the second fiber end. Further, the first fiber end may correspond to a point of termination of a cable jacket of the fiber-optic cable from the fiber-optic cable and the second fiber end corresponds to a point of application of the ferrule onto the optical fiber. This is explained in further detail in conjunction with FIG. 8 below.

Further, in some embodiments, the middle section 112 may include a main section and an extendable section. Further, the extendable section may be configured to extend through a plurality of section positions in relation to the main section. Further, the second cavity may be associated with a cavity length corresponding to each section position of the plurality of section positions.

Further, the third cavity 108 may be disposed at a fiber section 114 of the base body 102. Further, the third cavity 108 may be configured for immovably securing a ferrule (not shown).

Further, in some embodiments, the third cavity 108 may include a third cavity curvature characterized by a cavity curvature arc length. Further, the third cavity curvature may be configured for partly encompassing the ferrule characterized by a ferrule circumference length. Further, the cavity curvature arc length may be less than the ferrule circumference length. Further, the partly encompassing of the ferrule may facilitate the third cavity 108 for immovably securing the ferrule.

Further, in some embodiments, the third cavity 108 may include a lock mechanism (not shown) (disposed along a third cavity wall of the third cavity. Further, the lock mechanism may include at least one spring-loaded panel. Further, the at least one spring-loaded panel may be configured for immovably secure the ferrule in the third cavity 108. Further, the lock mechanism may be associated with a lock state and an unlock state. Further, the lock mechanism may not allow relative movement between the ferrule and the third cavity 108 in lock state. Further, the lock mechanism may allow relative movement between the ferrule and the third cavity 108 in the unlock state.

Figure 2:
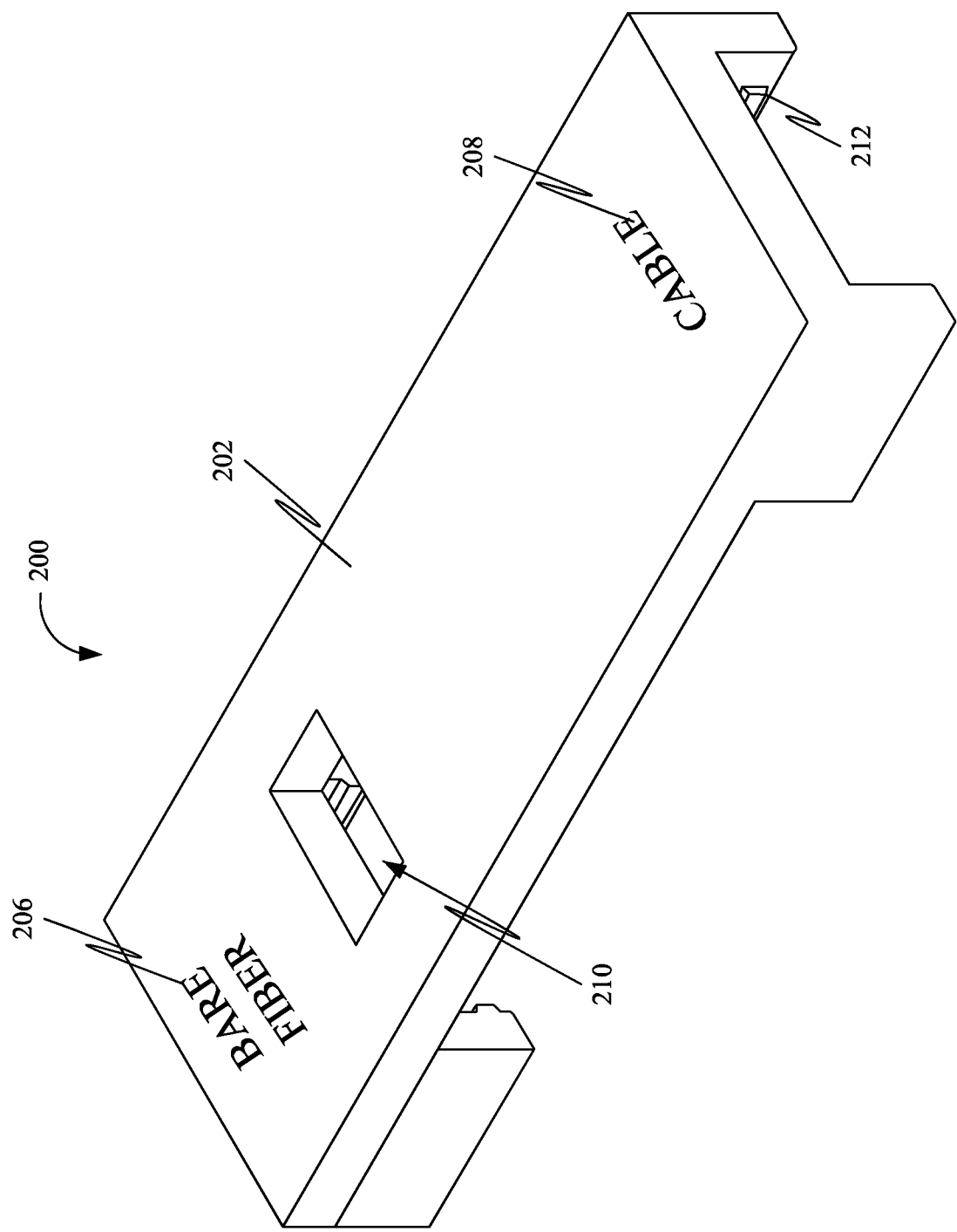
FIG. 2 is a top front perspective view of a top body of the cassette for securing fiber-optic cables and ferrules during the curing process, in accordance with some embodiments.

FIG. 2 is a top front perspective view of a top body 200 of the cassette 100 for securing fiber-optic cables and ferrules during the curing process, in accordance with some embodiments.

Figure 3:
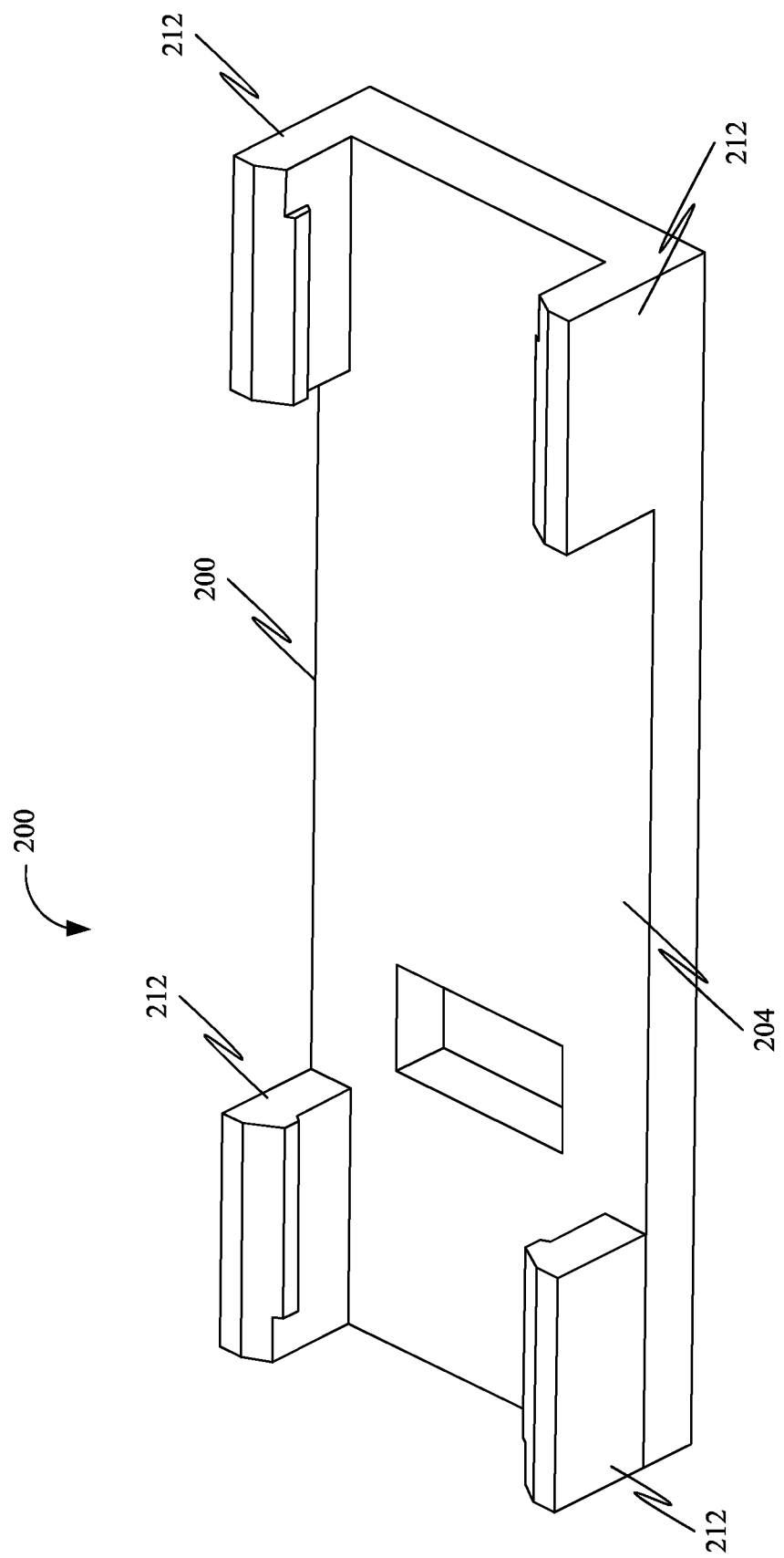
FIG. 3 is a bottom front perspective view of the top body, in accordance with some embodiments.

FIG. 3 is a bottom front perspective view of the top body 200, in accordance with some embodiments. Further, the top body 200 may be detachably coupled with the base body 102 using at least one coupling mechanism 212. As shown, the at least one coupling mechanism 212 may include one or more tabs which detachably engage with the base body 102.

Further, the top body 200 may be configured for covering at least one body surface of the base body 102. Further, each of the cable section 110, the middle section 112, and the fiber section 114 may be associated with a body surface of the at least one body surface.

Further, the top body 200 may include an upper body surface 202 and a lower body surface 204. Further, at least one of the upper body surface 202 and the lower body surface 204 may include at least one marking 206-208. Further, the at least one marking 206-208 may correspond to at least one of the cable section 110, the middle section 112, and the fiber section 114. Further, the at least one marking 206-208 may facilitate identification of at least one of the cable section 110, the middle section 112, and the fiber section 114.

Further, the top body 200 may include a top body opening 210 proximal to at least one of the cable section 110, the middle section 112, and the fiber section 114. Further, the top body opening 210 may be configured for providing ventilation to at least one of the first cavity 104, the second cavity 106, and the third cavity 108.

Figure 4:
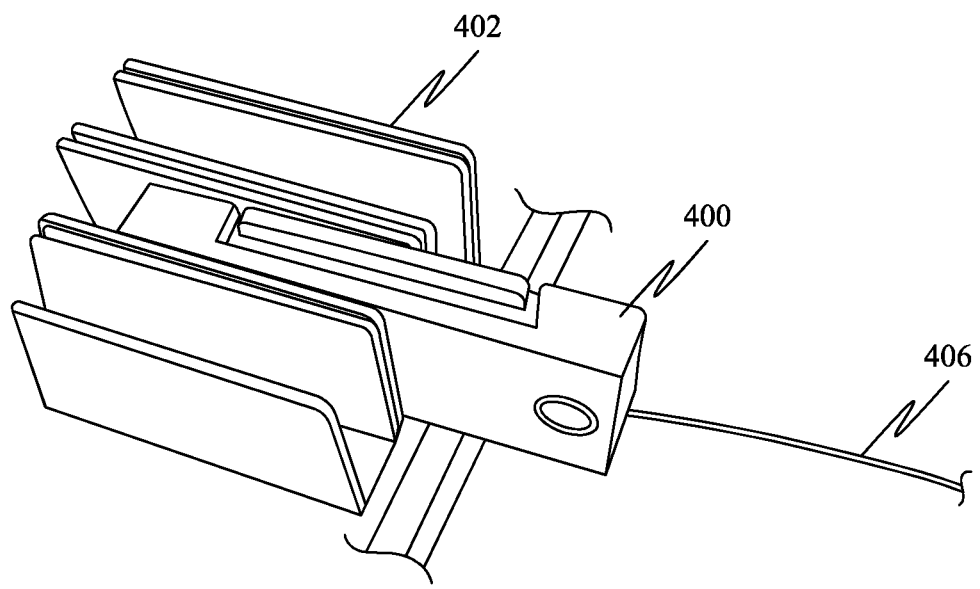
FIG. 4 is a top front perspective view of a cassette inserted in a fixture, in accordance with some embodiments.

FIG. 4 is a top front perspective view of a cassette 400 inserted in a fixture 402, in accordance with some embodiments. Further, the cassette 400 includes a top body and a base body. Further, the cassette 400 may be characterized by at least one cassette dimension. Further, the at least one cassette dimension may include one or more of a length, a breadth, a height, a diameter, and a circumference. Further, the at least one cassette dimension may facilitate insertion of the cassette 400 into the fixture 402. Further, the fixture 402 may be configured to comply with the at least one cassette dimension facilitating the insertion of the cassette 400 into the fixture 402. Further, the cassette 400 may secure a fiber-optic cable 406.

Figure 5:
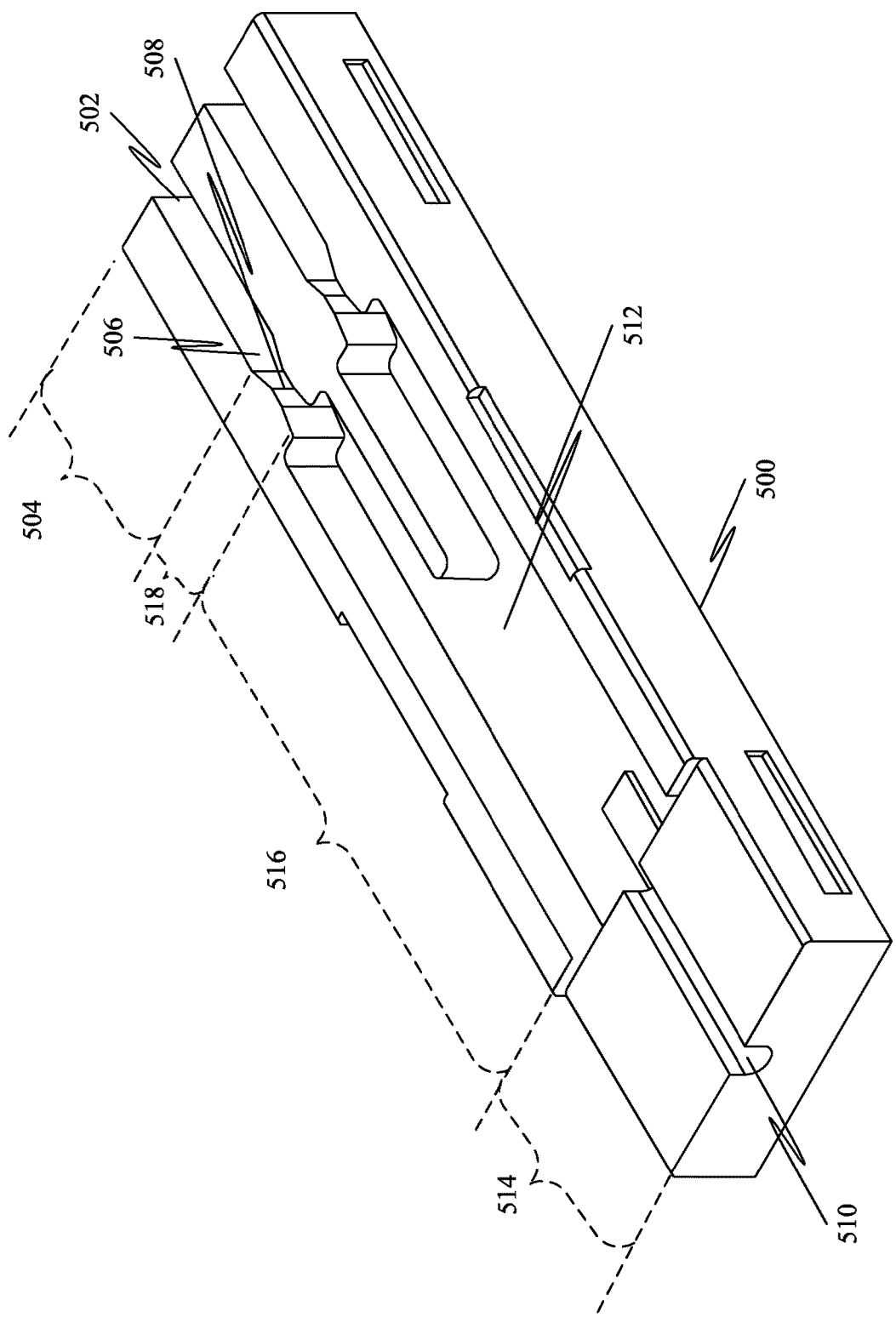
FIG. 5 is a top front perspective view of a base body of a cassette for securing fiber-optic cables and ferrules during the curing process, in accordance with some embodiments.

FIG. 5 is a top front perspective view of a base body 500 of a cassette for securing fiber-optic cables and ferrules during the curing process, in accordance with some embodiments. Further, the base body 500 may include a fourth cavity 502 disposed at an end section 504 of the cassette. Further, the fourth cavity 502 may be configured to receive an optical fiber of the fiber-optic cable protruding from the ferrule. Further, the fourth cavity 502 may include a fourth cavity opening 506 facilitating coupling of the fourth cavity 502 with a third cavity 508. Further, the optical fiber protruding from the ferrule may be received in the fourth cavity 502 through the fourth cavity opening.

Further, the base body 500 may include one or more of a first cavity 510, and a second cavity 512. Further, the first cavity 510 may be disposed at a cable section 514 of the base body 500. Further, the second cavity 512 may be disposed at a middle section 516 of the base body 500. Further, the third cavity 508 may be disposed at a fiber section 518 of the base body 102.

Figure 6:
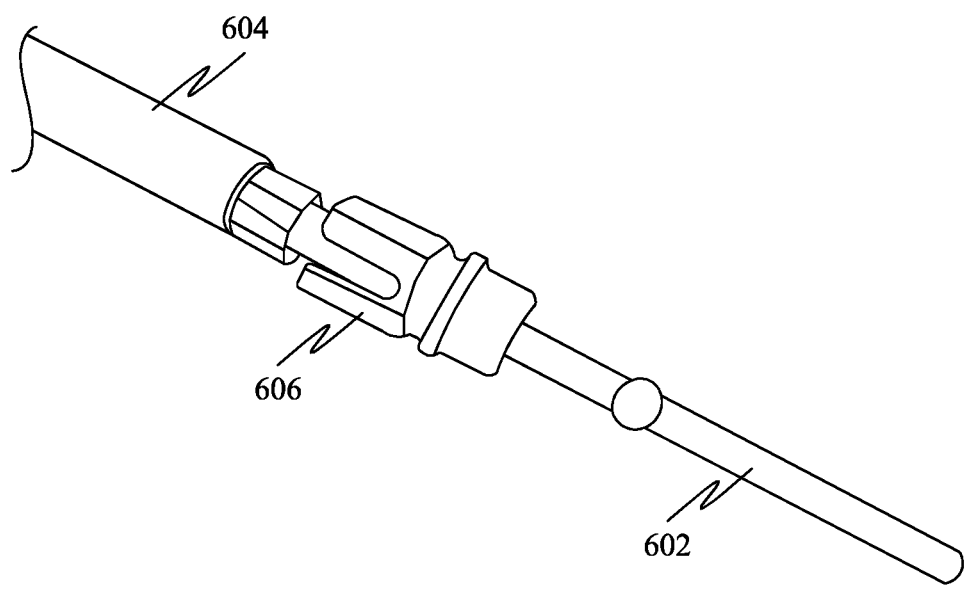
FIG. 6 is a perspective of a fiber optic cable protruding from a ferrule, in accordance with some embodiments.

Further, the fourth cavity 502 may be configured to receive a sleeve 602 (shown in FIG. 6).

FIG. 6 is a perspective of a fiber optic cable 604 protruding from a ferrule 606, in accordance with some embodiments. Further, the sleeve 602 may be characterized by a hollow elongated body and a sleeve opening disposed on the elongated body. Further, the sleeve 602 may be detachably coupled with the ferrule 606. Further, the sleeve 602 may be configured to receive an optical fiber of the fiber-optic cable 604 protruding from the ferrule 606 through the sleeve opening in the hollow elongated body.

Figure 7:
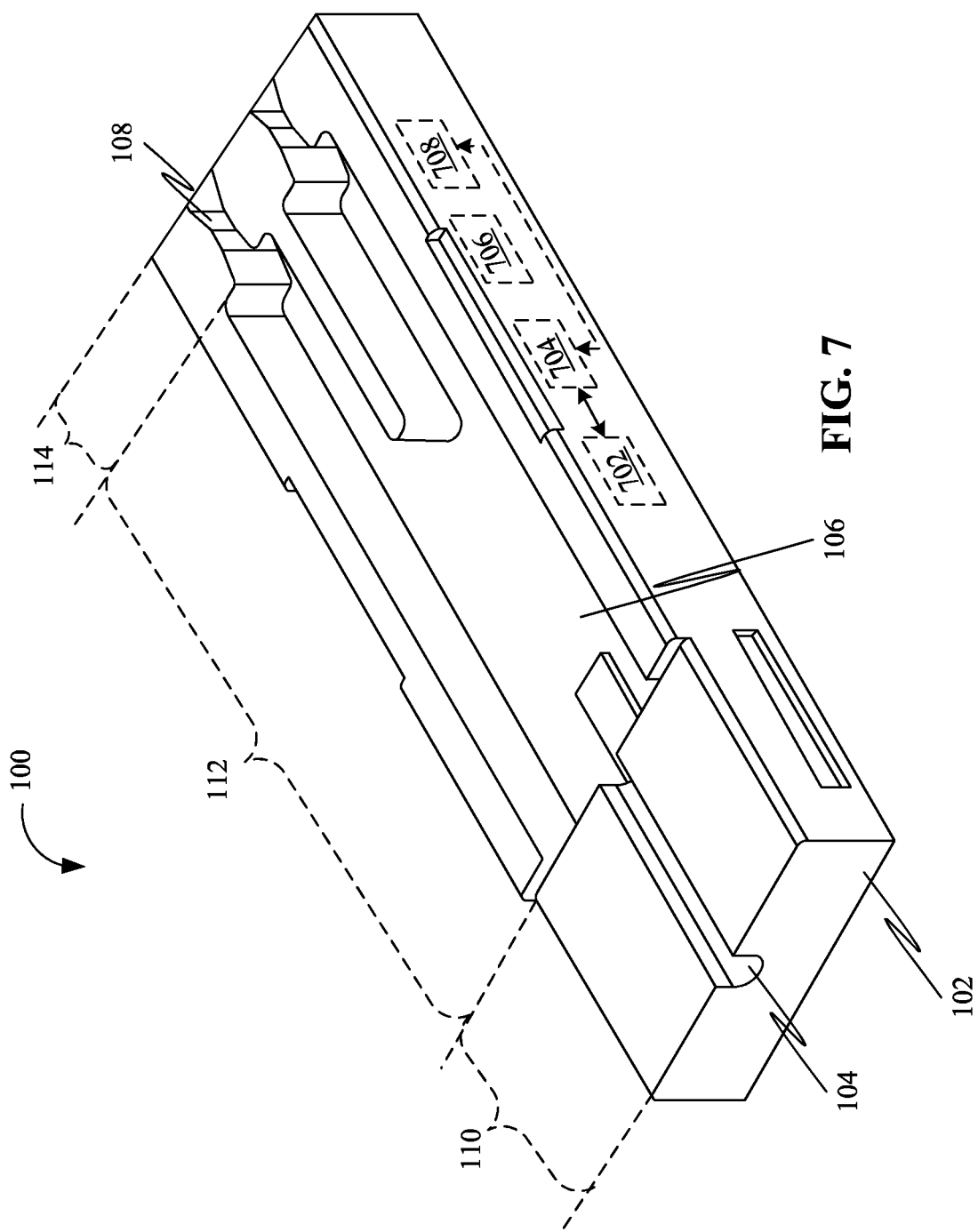
FIG. 7 is a top front perspective view of the cassette for securing fiber-optic cables and ferrules during the curing process, in accordance with further embodiments.

FIG. 7 is a top front perspective view of the cassette 100 for securing fiber-optic cables and ferrules during the curing process, in accordance with further embodiments. Further, the cassette 100 may include at least one cassette sensor 702 disposed on the base body 102. Further, the at least one cassette sensor 702 may be configured to generate at least one cassette sensor data. Further, the at least one cassette sensor data may be associated with at least one state of the base body 102. Further, the at least one state may be related to one or more of environmental state (such as the temperature, the pressure, the humidity, the light intensity) and an orientation of the base body 102.

Further, the cassette 100 may include a processing device 704 communicatively coupled with the at least one cassette sensor 702. Further, the processing device 704 may be configured for analyzing the at least one cassette sensor data and generating a cassette notification based on the analyzing. Further, the cassette 100 may include a presenting device 706 communicatively coupled with the processing device 704. Further, the presenting device 706 may be configured for presenting the cassette notification. Further, the presenting device 706 may be configured for presenting the cassette notification to at least one user (such as user 1212) associated with the cassette 100.

Further, the cassette 100 may include a storage device 708 communicatively coupled with the processing device 704. Further, the storage device 708 may be configured for storing the cassette notification.

Figure 8:
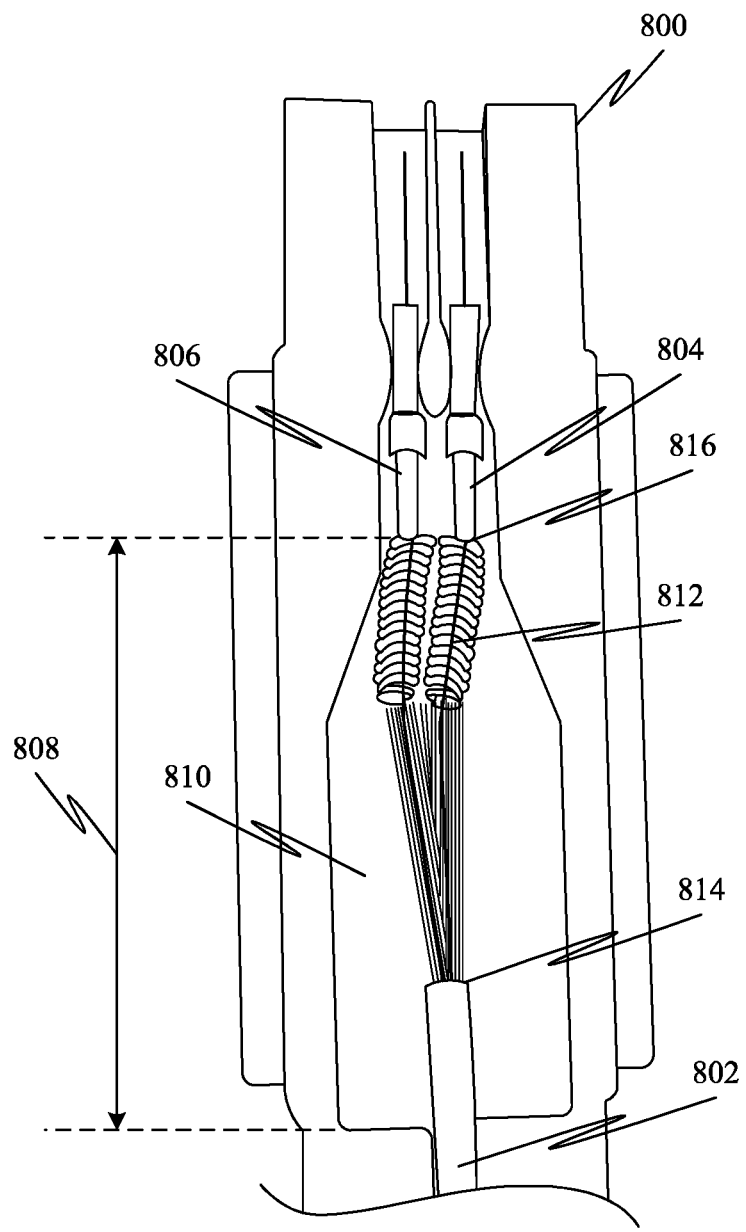
FIG. 8 is a top view of a cassette for securing a fiber-optic cable and ferrules during the curing process, in accordance with further embodiments.

FIG. 8 is a top view of a cassette 800 for securing a fiber-optic cable 802 and ferrules 804-806 during the curing process, in accordance with further embodiments. Further, a cavity length 808 (of a second cavity 810) may correspond to a length of an optical fiber 812 of the fiber-optic cable 802 from a first fiber end 814 to a second fiber end 816. Further, the first fiber end 814 may correspond to a point of termination of a cable jacket of the fiber-optic cable 802 from the fiber-optic cable 802. Further, the second fiber end 816 may correspond to a point of application of the ferrule 804 onto the optical fiber 812.

Figure 9:
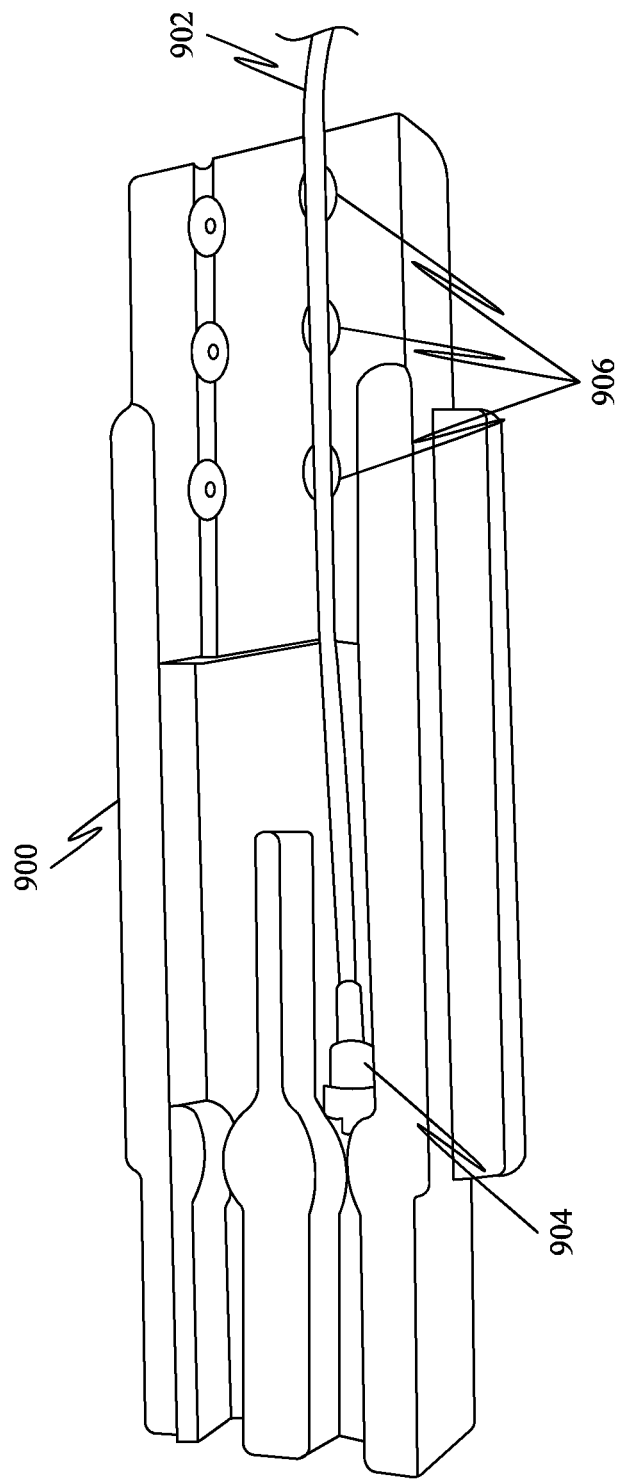
FIG. 9 is a top left perspective view of a cassette for securing a fiber-optic cable and ferrules during the curing process, in accordance with further embodiments.

FIG. 9 is a top left perspective view of a cassette 900 for securing a fiber-optic cable and ferrules during the curing process, in accordance with further embodiments. Further, the cassette 900 may include a fiber optic cable 902 and a ferrule 904. Further, the fiber optic cable 902 passes through a first cavity of the cassette 900. Further, the first cavity may include a lock mechanism 906 disposed along a first cavity wall of the first cavity. Further, the lock mechanism 906 may include at least one spring-loaded panel. Further, the at least one spring-loaded panel may be configured for immovably securing the fiber-optic cable 902 in the first cavity. Further, the lock mechanism 906 may be associated with a lock state and an unlock state. Further, the lock mechanism 906 may not allow relative movement between the fiber-optic cable 902 and the first cavity in lock state. Further, the lock mechanism 906 may allow relative movement between the fiber-optic cable 902 and the first cavity in the unlock state.

Figure 10:
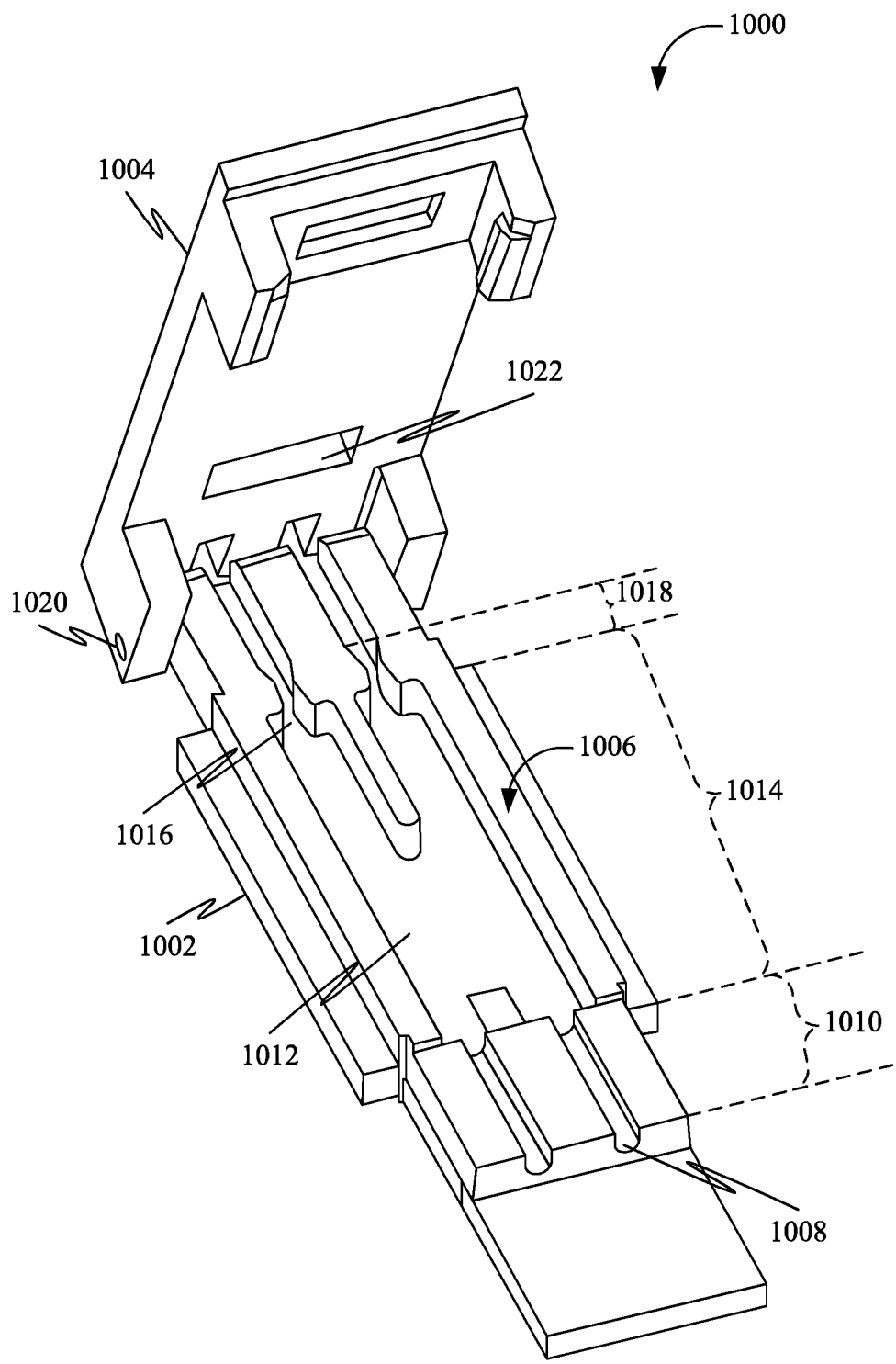
FIG. 10 is a top front perspective view of a cassette for securing fiber-optic cables and ferrules during the curing process, in accordance with some embodiments.

FIG. 10 is a top front perspective view of a cassette 1000 for securing fiber-optic cables and ferrules during the curing process, in accordance with some embodiments. Further, the cassette 1000 may include a base body 1002 and a top body 1004. Further, the base body 1002 may include an upper body surface 1006 and a lower body surface (not shown). Further, the base body 1002 may include a first cavity 1008 disposed at a cable section 1010 of the upper body surface 1006. Further, the first cavity 1008 may be configured for immovably securing a fiber-optic cable.

Further, the base body 1002 may include a second cavity 1012 disposed at a middle section 1014 of the upper body surface 1006. Further, the second cavity 1012 may be characterized by a cavity length. Further, the cavity length may correspond to a length of the fiber-optic cable from a first cable end to a second cable end. Further, the second cavity 1012 may be configured for accommodating the fiber-optic cable along the cavity length.

Further, the base body 1002 may include a third cavity 1016 disposed at a fiber section 1018 of the upper body surface 1006. Further, the third cavity may be configured for immovably securing a ferrule.

Further, the top body 1004 may be detachably coupled with the base body 1002 using at least one coupling mechanism 1020. Further, the top body 1002 may be configured for covering the upper body surface 1006.

Further, in some embodiments, the top body 1004 may include a top upper body surface and a top lower body surface. Further, at least one of the top upper body surface and the top lower body surface may include at least one marking (not shown). Further, the at least one marking may correspond to at least one of the cable section, the middle section, and the fiber section. Further, he at least one marking may facilitate identification of at least one of the cable section 1010, the middle section 1014, and the fiber section 1018.

Further, in some embodiments, the top body 1004 may include a top body opening 1022 proximal to at least one of the cable section 1010, the middle section 1014, and the fiber section 1018. Further, the top body opening 1022 may be configured for providing ventilation to at least one of the first cavity 1008, the second cavity 1012, and the third cavity 1016.

Further, in some embodiments, the first cavity 1008 may include a first cavity curvature characterized by a cavity curvature arc length. Further, the first cavity curvature may be configured for partly encompassing a cable jacket of the fiber-optic cable characterized by a cable jacket circumference length. Further, the cavity curvature arc length may be less than the cable jacket circumference length. Further, the partly encompassing of the cable jacket facilitates the first cavity 1008 for immovably securing the fiber-optic cable.

Further, in some embodiments, the third cavity 1016 may include a third cavity curvature characterized by a cavity curvature arc length. Further, the third cavity curvature may be configured for partly encompassing the ferrule characterized by a ferrule circumference length. Further, the cavity curvature arc length may be less than the ferrule circumference length. Further, the partly encompassing of the ferrule facilitates the third cavity 1016 for immovably securing the ferrule.

Figure 11:
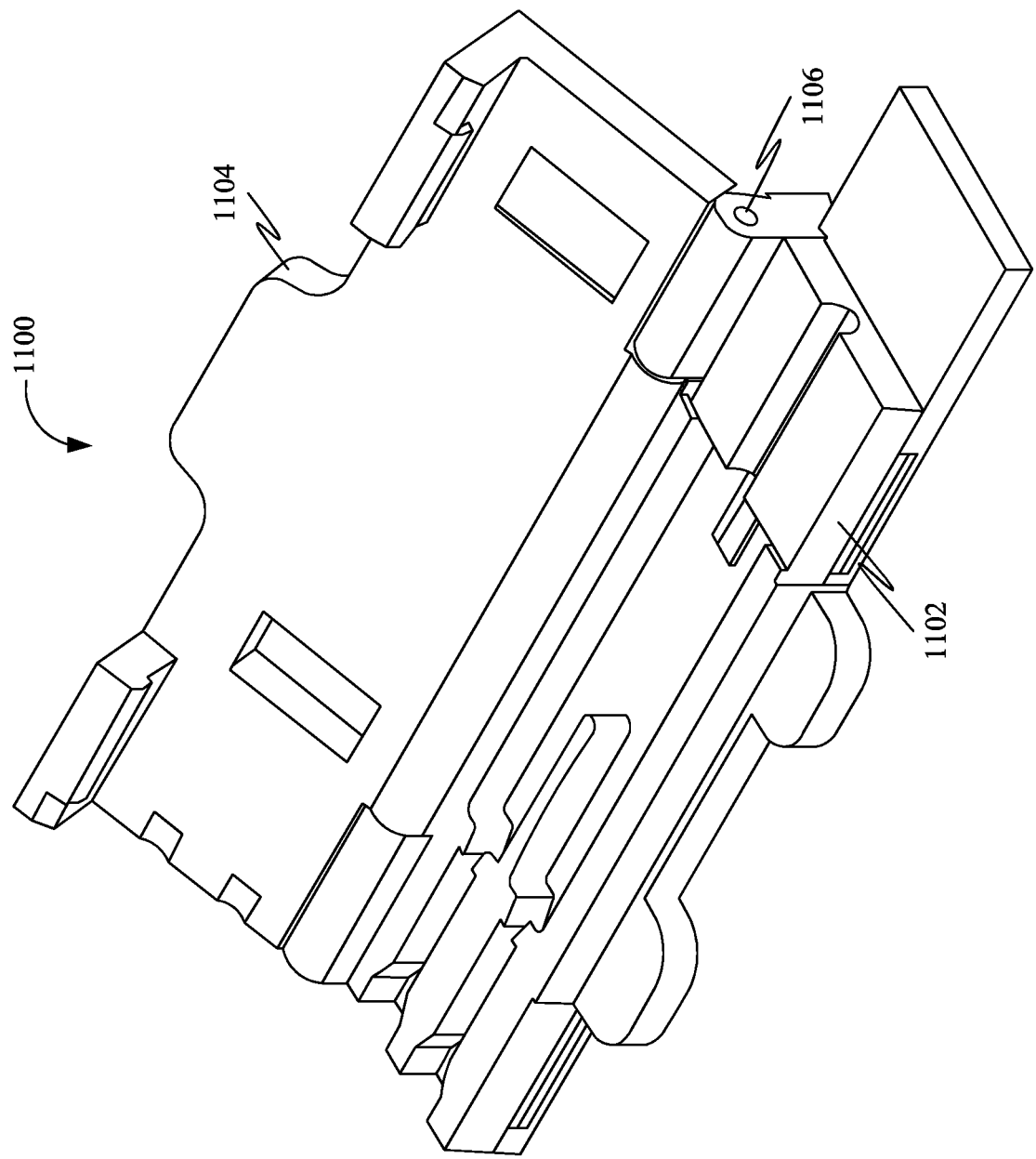
FIG. 11 is a top front perspective view of a cassette for securing fiber-optic cables and ferrules during the curing process, in accordance with some embodiments.

FIG. 11 is a top front perspective view of a cassette 1100 for securing fiber-optic cables and ferrules during the curing process, in accordance with some embodiments. Further, the cassette 1100 may include a base body 1102 and a top body 1104. Further, the top body 1104 may be detachably coupled with the base body 1102 using at least one coupling mechanism 1106.

Figure 12:
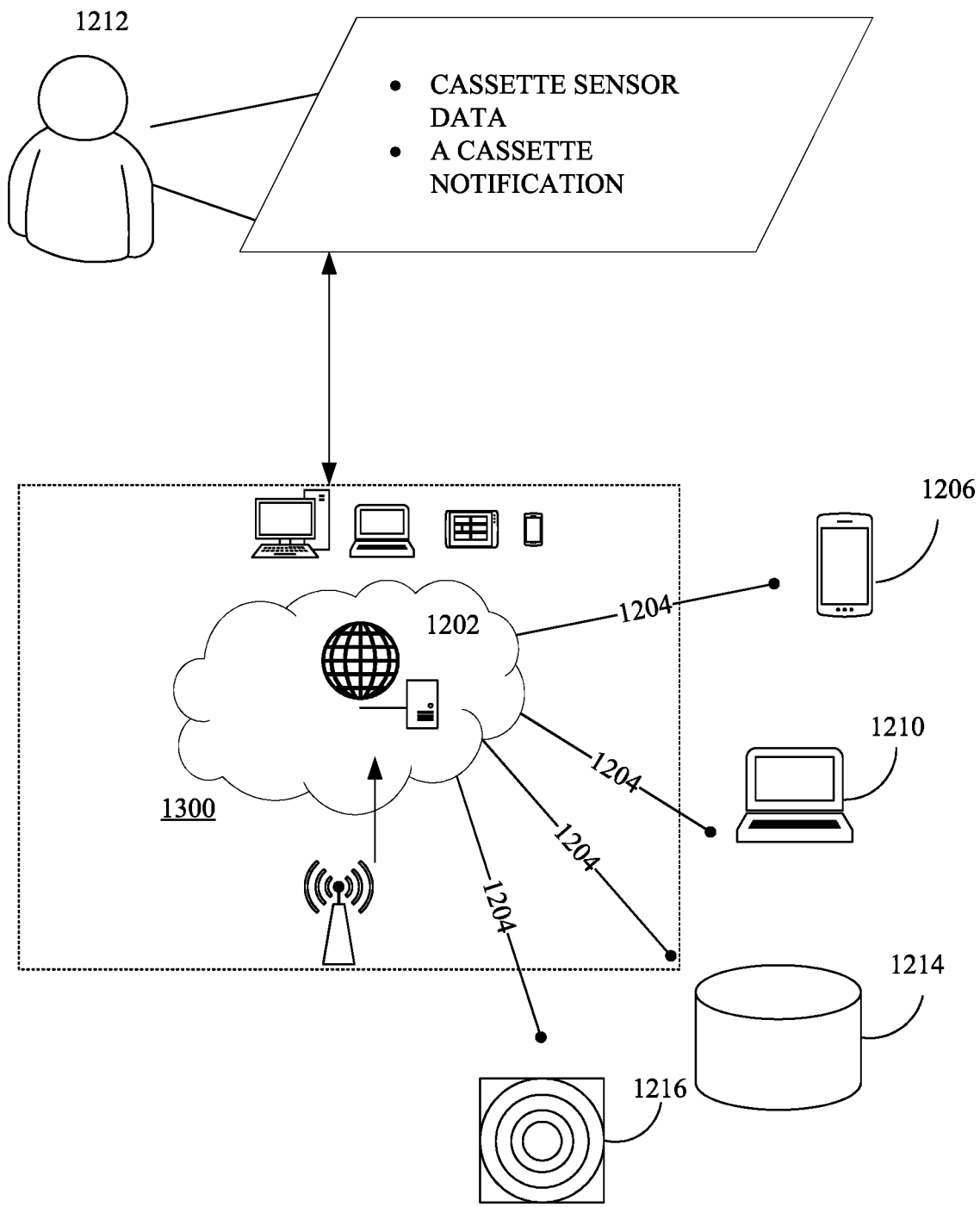
FIG. 12 is an illustration of an online platform consistent with various embodiments of the present disclosure.

FIG. 12 is an illustration of an online platform 1200 consistent with various embodiments of the present disclosure. By way of non-limiting example, the online platform 1200 to facilitate management of cassettes used for securing fiber-optic cables and ferrules during the curing process may be hosted on a centralized server 1202, such as, for example, a cloud computing service. The centralized server 1202 may communicate with other network entities, such as, for example, a mobile device 1206 (such as a smartphone, a laptop, a tablet computer, etc.), other electronic devices 1210 (such as desktop computers, server computers, etc.), databases 1214, sensors 1216 (such as the cassette sensor 702), over a communication network 1204, such as, but not limited to, the Internet. Further, users of the online platform 1200 may include relevant parties such as, but not limited to, administrators. Accordingly, in some instances, electronic devices operated by the one or more relevant parties may be in communication with the platform.

A user 1212, such as the one or more relevant parties, may access online platform 1100 through a web-based software application or browser. The web-based software application may be embodied as, for example, but not be limited to, a website, a web application, a desktop application, and a mobile application compatible with a computing device 1300.

Figure 13:
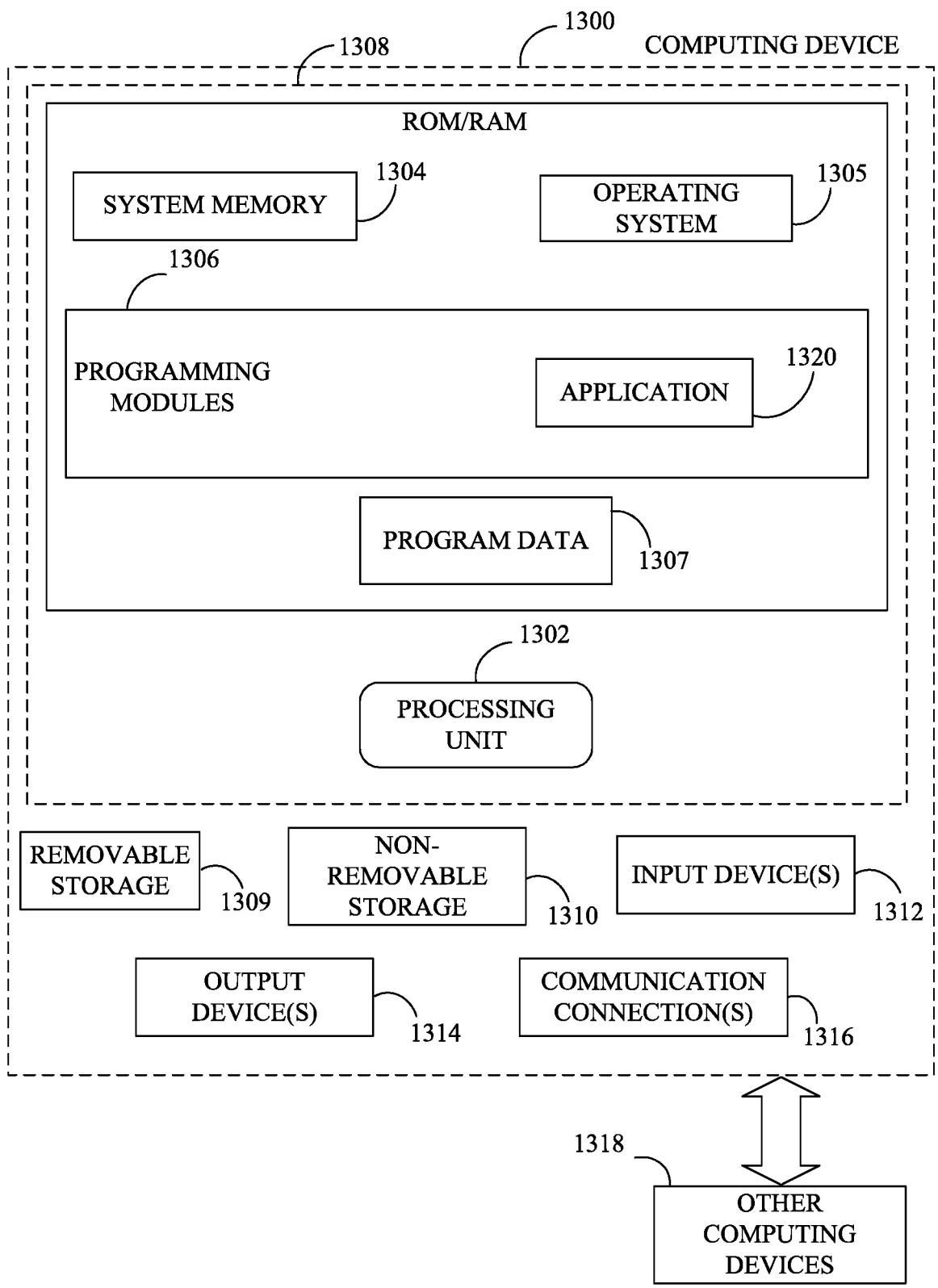
FIG. 13 is a block diagram of a computing device for implementing the methods disclosed herein, in accordance with some embodiments.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random-access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include machine learning module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A cassette for securing fiber-optic cables and ferrules during a fiber optics curing process, wherein the cassette comprises:
   a base body, wherein the base body comprises:
      a first cavity disposed at a cable section of the base body, wherein the first cavity is configured for immovably securing a fiber-optic cable;
      a second cavity is disposed at a middle section of the base body, wherein the second cavity is characterized by a cavity length, wherein the cavity length corresponds to a length of the fiber-optic cable from a first cable end to a second cable end, the wherein the second cavity is configured for accommodating the fiber-optic cable along the cavity length; and
      a third cavity disposed at a fiber section of the base body, wherein the third cavity is configured for immovably securing a ferrule.

2. The cassette of claim 1 further comprising a top body detachably coupled with the base body using at least one coupling mechanism, wherein the top body is configured for covering at least one body surface of the base body, wherein each of the cable section, the middle section, and the fiber section is associated with a body surface of the at least one body surface.

3. The cassette of claim 2, wherein the top body comprises an upper body surface and a lower body surface, wherein at least one of the upper body surface and the lower body surface comprises at least one marking, wherein the at least one marking corresponds to at least one of the cable section, the middle section, and the fiber section, wherein the at least one marking facilitates identification of at least one of the cable section, the middle section, and the fiber section.

4. The cassette of claim 2, wherein the top body comprises a top body opening proximal to at least one of the cable section, the middle section, and the fiber section, wherein the top body opening is configured for providing ventilation to at least one of the first cavity, the second cavity, and the third cavity.

5. The cassette of claim 1, wherein the cavity length corresponds to a length of an optical fiber of the fiber-optic cable from thea first fiber end to a second fiber end, wherein the first fiber end corresponds to a point of termination of a cable jacket of the fiber-optic cable from the fiber-optic cable and the second fiber end corresponds to a point of application of the ferrule onto the optical fiber.

6. The cassette of claim 1, wherein the middle section comprises a main section and an extendable section, wherein the extendable section is configured to extend through a plurality of section positions in relation to the main section, wherein the second cavity is associated with a cavity length corresponding to each section position of the plurality of section positions.

7. The cassette of claim 1, wherein the first cavity comprises a first cavity curvature characterized by a cavity curvature arc length, wherein the first cavity curvature is configured for partly encompassing a cable jacket of the fiber-optic cable characterized by a cable jacket circumference length, wherein the cavity curvature arc length is less than the cable jacket circumference length, wherein the partly encompassing of the cable jacket facilitates the first cavity for immovably securing the fiber-optic cable.

8. The cassette of claim 1, wherein the third cavity comprises a third cavity curvature characterized by a cavity curvature arc length, wherein the third cavity curvature is configured for partly encompassing the ferrule characterized by a ferrule circumference length, wherein the cavity curvature arc length is less than the ferrule circumference length, wherein the partly encompassing of the ferrule facilitates the third cavity for immovably securing the ferrule.

9. The cassette of claim 1, wherein the first cavity comprises a lock mechanism disposed along a first cavity wall of the first cavity, wherein the lock mechanism comprises at least one spring-loaded panel, wherein the at least one spring-loaded panel is configured for immovably securing the fiber-optic cable in the first cavity, wherein the lock mechanism has a lock state and an unlock state, wherein the lock mechanism does not allow relative movement between the fiber-optic cable and the first cavity in lock state, wherein the lock mechanism allows relative movement between the fiber-optic cable and the first cavity in the unlock state.

10. The cassette of claim 1, wherein the third cavity comprises a lock mechanism disposed along a third cavity wall of the third cavity, wherein the lock mechanism comprises at least one spring-loaded panel, wherein the at least one spring-loaded panel is configured for immovably secure the ferrule in the third cavity, wherein the lock mechanism has a lock state and an unlock state, wherein the lock mechanism does not allow relative movement between the ferrule and the third cavity in lock state, wherein the lock mechanism allows relative movement between the ferrule and the third cavity in the unlock state.

11. The cassette of claim 1, wherein the cassette is comprises at least one cassette dimension, wherein the at least one cassette dimension facilitates insertion of the cassette into a fixture, wherein the fixture is configured to comply with the at last one cassette dimension facilitating the insertion of the cassette into the fixture.

12. The cassette of claim 1 further comprising a fourth cavity disposed at an end section of the cassette, wherein the fourth cavity is configured to receive an optical fiber of the fiber-optic cable protruding from the ferrule, wherein the fourth cavity comprises a fourth cavity opening facilitating coupling of the fourth cavity with the third cavity, wherein the optical fiber protruding from the ferrule is received in the fourth cavity through the fourth cavity opening.

13. The cassette of claim 12, wherein the fourth cavity is configured to receive a sleeve, wherein the sleeve comprises a hollow elongated body and a sleeve opening disposed on the elongated body, wherein the sleeve is detachably coupled with the ferrule, wherein the sleeve is configured to receive an optical fiber of the fiber-optic cable protruding from the ferrule through the sleeve opening in the hollow elongated body.

14. The cassette of claim 1 further comprising:
at least one cassette sensor disposed on the base body, wherein the at least one sensor is configured to generate at least one cassette sensor data, wherein the at least one cassette sensor data is associated with at least one state of the base body;
a processing device communicatively coupled with the at least one cassette sensor, wherein the processing device is configured for:
analyzing the at least one cassette sensor data; and
generating a cassette notification based on the analyzing; and a presenting device communicatively coupled with the processing device, wherein the presenting device is configured for presenting the cassette notification.

15. The cassette of claim 14 further comprising a storage device communicatively coupled with the processing device, wherein the storage device is configured for storing the cassette notification.

16. A cassette for securing fiber-optic cables and ferrules during a fiber optics curing process, wherein the cassette comprises:
a base body comprises an upper body surface and a lower body surface, wherein the base body comprises:
a first cavity disposed at a cable section of the upper body surface, wherein the first cavity is configured for immovably securing a fiber-optic cable;
a second cavity is disposed at a middle section of the upper body surface, wherein the second cavity is characterized by a cavity length, wherein the cavity length corresponds to a length of the fiber-optic cable from a first cable end to a second cable end, the wherein the second cavity is configured for accommodating the fiber-optic cable along the cavity length;
a third cavity disposed at a fiber section of the upper body surface, wherein the third cavity is configured for immovably securing a ferrule; and
a top body detachably coupled with the base body using at least one coupling mechanism, wherein the top body is configured for covering the upper body surface.

17. The cassette of claim 16, wherein the top body comprises a top upper body surface and a top lower body surface, wherein at least one of the top upper body surface and the top lower body surface comprises at least one marking, wherein the at least one marking corresponds to at least one of the cable section, the middle section, and the fiber section, wherein the at least one marking facilitates identification of at least one of the cable section, the middle section, and the fiber section.

18. The cassette of claim 16, wherein the top body comprises a top body opening proximal to at least one of the cable section, the middle section, and the fiber section, wherein the top body opening is configured for providing ventilation to at least one of the first cavity, the second cavity, and the third cavity.

19. The cassette of claim 16, wherein the first cavity comprises a first cavity curvature characterized by a cavity curvature arc length, wherein the first cavity curvature is configured for partly encompassing a cable jacket of the fiber-optic cable characterized by a cable jacket circumference length, wherein the cavity curvature arc length is less than the cable jacket circumference length, wherein the partly encompassing of the cable jacket facilitates the first cavity for immovably securing the fiber-optic cable.

20. The cassette of claim 16, wherein the third cavity comprises a third cavity curvature characterized by a cavity curvature arc length, wherein the third cavity curvature is configured for partly encompassing the ferrule characterized by a ferrule circumference length, wherein the cavity curvature arc length is less than the ferrule circumference length, wherein the partly encompassing of the ferrule facilitates the third cavity for immovably securing the ferrule.

* * * * *